United States Patent
Zimmel et al.

(10) Patent No.: US 10,754,102 B2
(45) Date of Patent: Aug. 25, 2020

(54) MECHANICAL INTERFACE BETWEEN A FIBER OPTIC CABLE AND A FIBER OPTIC CONNECTOR

(71) Applicant: CommScope Technologies LLC, Hickory, NC (US)

(72) Inventors: Steven C. Zimmel, Minneapolis, MN (US); Yu Lu, Eden Prairie, MN (US); Patrick J. Nault, Carver, MN (US); Scott C. Kowalczyk, Savage, MN (US); Scott Droege, Burnsville, MN (US); Brent Campbell, Minneapolis, MN (US); Christopher Stroth, Lakeville, MN (US)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 16/363,636

(22) Filed: Mar. 25, 2019

(65) Prior Publication Data
US 2019/0285809 A1 Sep. 19, 2019

Related U.S. Application Data

(60) Continuation of application No. 15/707,252, filed on Sep. 18, 2017, now Pat. No. 10,247,888, which is a continuation of application No. 14/176,940, filed on Feb. 10, 2014, now Pat. No. 9,766,413, which is a division of application No. 12/782,929, filed on May 19, 2010, now Pat. No. 8,646,989.

(60) Provisional application No. 61/179,673, filed on May 19, 2009.

(51) Int. Cl.
G02B 6/36 (2006.01)
G02B 6/38 (2006.01)

(52) U.S. Cl.
CPC .......... *G02B 6/3869* (2013.01); *G02B 6/381* (2013.01); *G02B 6/3885* (2013.01); *G02B 6/3887* (2013.01); *G02B 6/3821* (2013.01)

(58) Field of Classification Search
CPC .................................................. G02B 6/3869
USPC ........................................................ 385/81
See application file for complete search history.

(56) References Cited

U.S. PATENT DOCUMENTS

| 4,611,887 A | 9/1986 | Glover et al. |
| 4,647,717 A | 3/1987 | Uken |
| 4,964,685 A | 10/1990 | Savitsky et al. |
| 5,096,276 A | 3/1992 | Gerace et al. |
| 5,142,602 A | 8/1992 | Cabato et al. |

(Continued)

OTHER PUBLICATIONS

International Search Report and Written Opinion for PCT/US2010/035370 dated Dec. 29, 2010.

*Primary Examiner* — Eric Wong
(74) *Attorney, Agent, or Firm* — Merchant & Gould P.C.

(57) ABSTRACT

A fiber optic connector and cable assembly includes a cable and a fiber optic connector. The connector has a main connector body, a ferrule, a spring for biasing the ferrule, and a spring push for retaining the spring within the main connector body. A crimp band is provided for securing the fiber optic cable to the fiber optic connector. The crimp band includes a first portion securing a cable strength member. The crimp band also includes a second portion crimped down on a jacket of the cable. The crimp band further includes an inner surface having gripping structures for gripping the strength member and/or the jacket.

25 Claims, 9 Drawing Sheets

(56) References Cited

U.S. PATENT DOCUMENTS

| | | |
|---|---|---|
| 5,214,730 A | 5/1993 | Nagasawa et al. |
| 5,214,731 A | 5/1993 | Chang et al. |
| 5,418,874 A | 5/1995 | Carlisle et al. |
| 5,943,460 A | 8/1999 | Mead et al. |
| 6,499,887 B2 | 12/2002 | Dean, Jr. et al. |
| 6,648,520 B2 | 11/2003 | McDonald et al. |
| 6,738,555 B1 | 5/2004 | Cooke et al. |
| 6,816,661 B1 | 11/2004 | Barnes et al. |
| 7,079,734 B2 | 7/2006 | Seddon et al. |
| 7,090,406 B2 | 8/2006 | Melton et al. |
| 7,104,702 B2 | 9/2006 | Barnes et al. |
| 7,137,742 B2 | 11/2006 | Theuerkorn et al. |
| 7,146,090 B2 | 12/2006 | Vo et al. |
| 7,150,567 B1 | 12/2006 | Luther et al. |
| 7,192,195 B2 | 3/2007 | Turner |
| 7,204,644 B2 | 4/2007 | Barnes et al. |
| 7,270,487 B2 | 9/2007 | Billman et al. |
| 7,331,719 B2 | 2/2008 | Manning et al. |
| 7,537,393 B2 | 5/2009 | Anderson et al. |
| 7,572,065 B2 | 8/2009 | Lu et al. |
| 7,594,764 B2 | 9/2009 | Palmer et al. |
| 7,628,545 B2 | 12/2009 | Cody et al. |
| 7,744,288 B2 | 6/2010 | Lu et al. |
| 7,785,019 B2 | 8/2010 | Lewallen et al. |
| 8,646,989 B2 | 2/2014 | Zimmel et al. |
| 9,766,413 B2 | 9/2017 | Zimmel et al. |
| 10,247,888 B2 | 4/2019 | Zimmel et al. |
| 2002/0118926 A1* | 8/2002 | Shimoji .............. G02B 6/3821 385/76 |
| 2002/0164130 A1 | 11/2002 | Elkins, II et al. |
| 2004/0120656 A1* | 6/2004 | Banas ................ G02B 6/3887 385/86 |
| 2005/0213897 A1* | 9/2005 | Palmer ............... G02B 6/3833 385/95 |
| 2005/0238292 A1 | 10/2005 | Barnes et al. |
| 2006/0263011 A1 | 11/2006 | Chen et al. |
| 2008/0175542 A1* | 7/2008 | Lu ..................... G02B 6/3816 385/62 |
| 2009/0035993 A1 | 2/2009 | Okayasu |
| 2010/0034502 A1 | 2/2010 | Lu et al. |
| 2010/0054680 A1 | 3/2010 | Lochkovic et al. |
| 2010/0080511 A1 | 4/2010 | Luther et al. |
| 2012/0045178 A1 | 2/2012 | Theuerkorn |

* cited by examiner

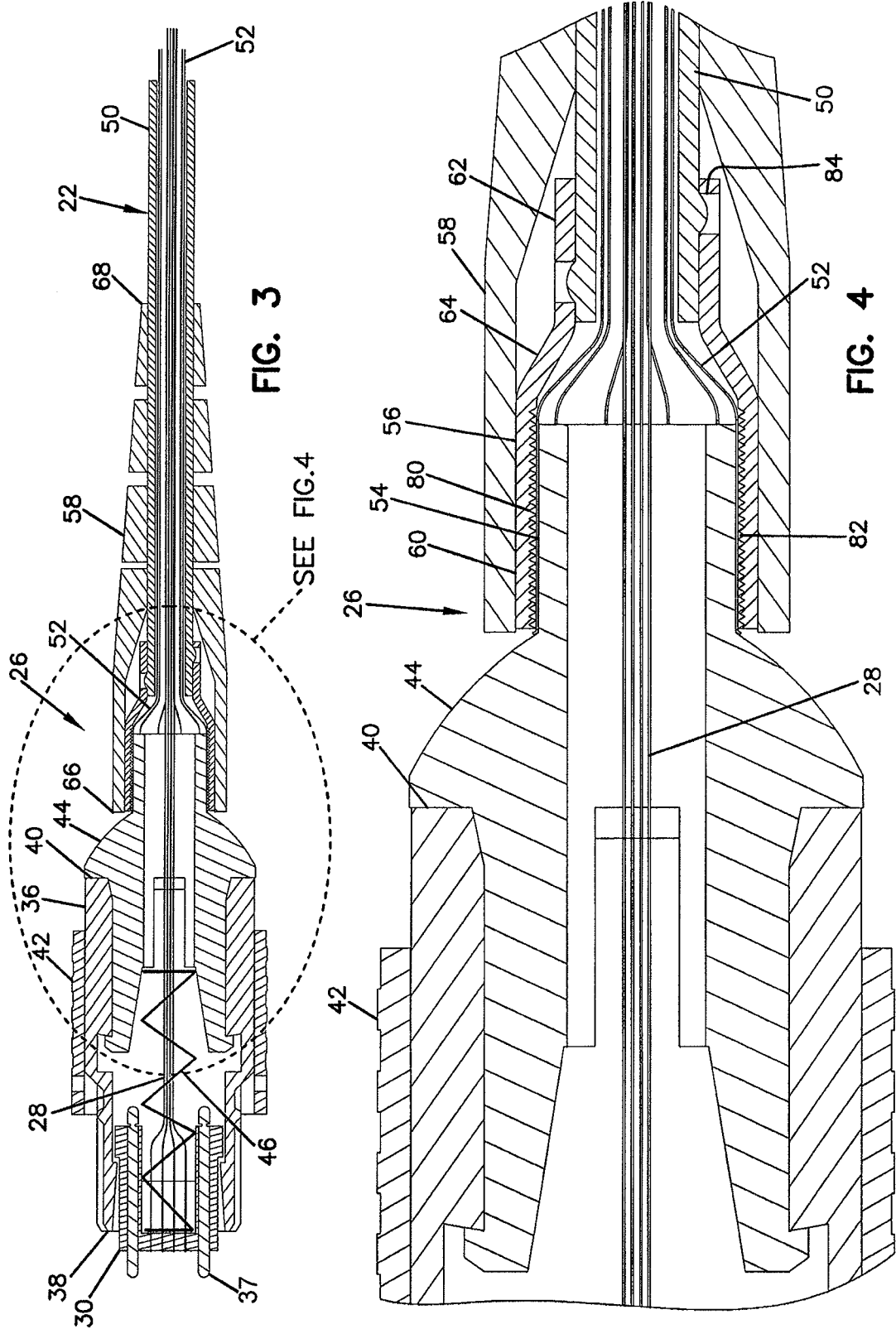

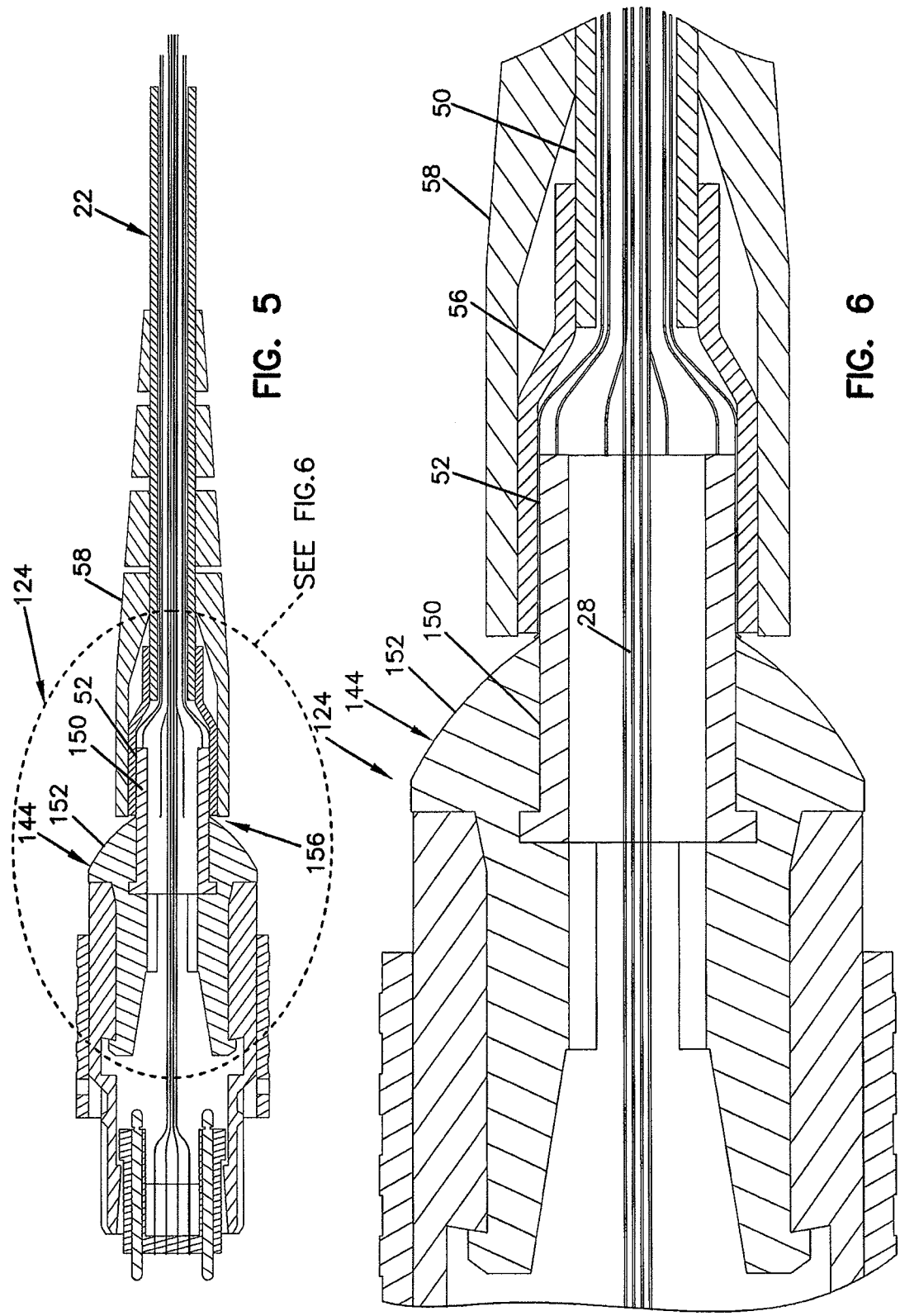

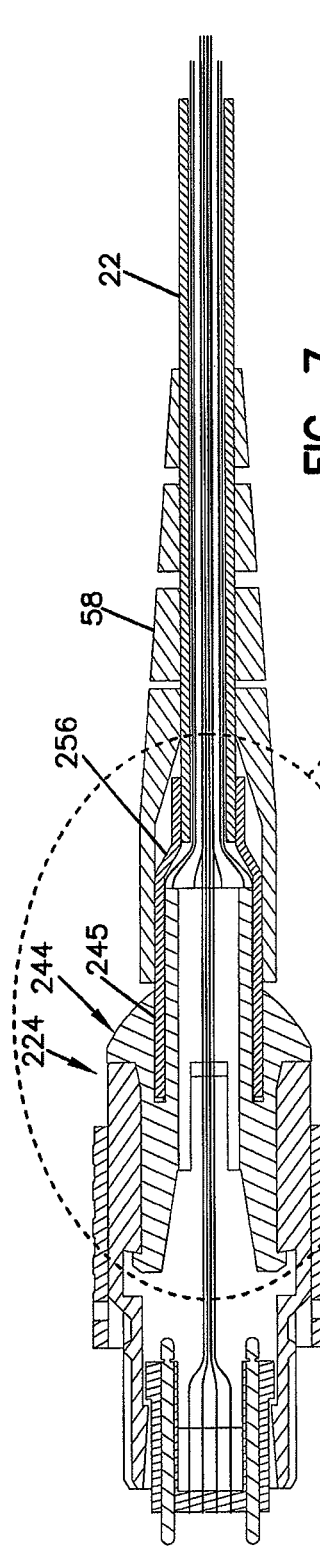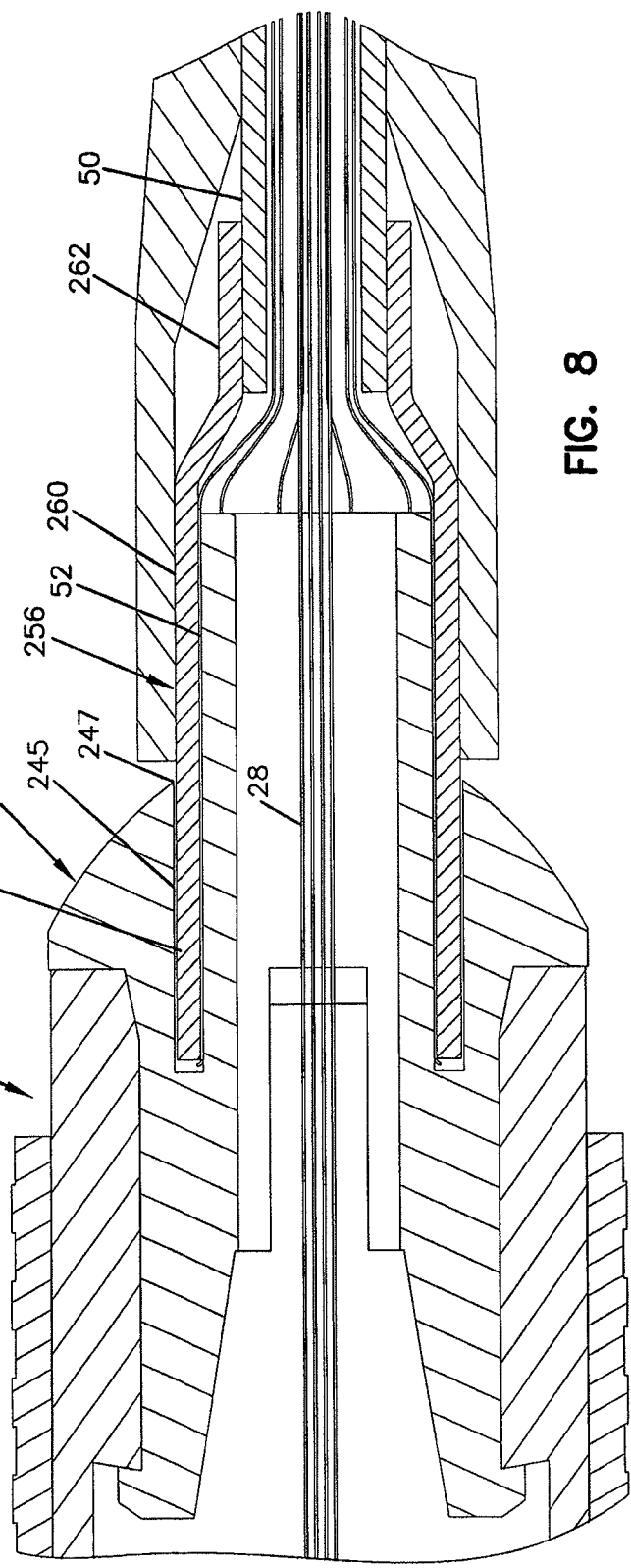

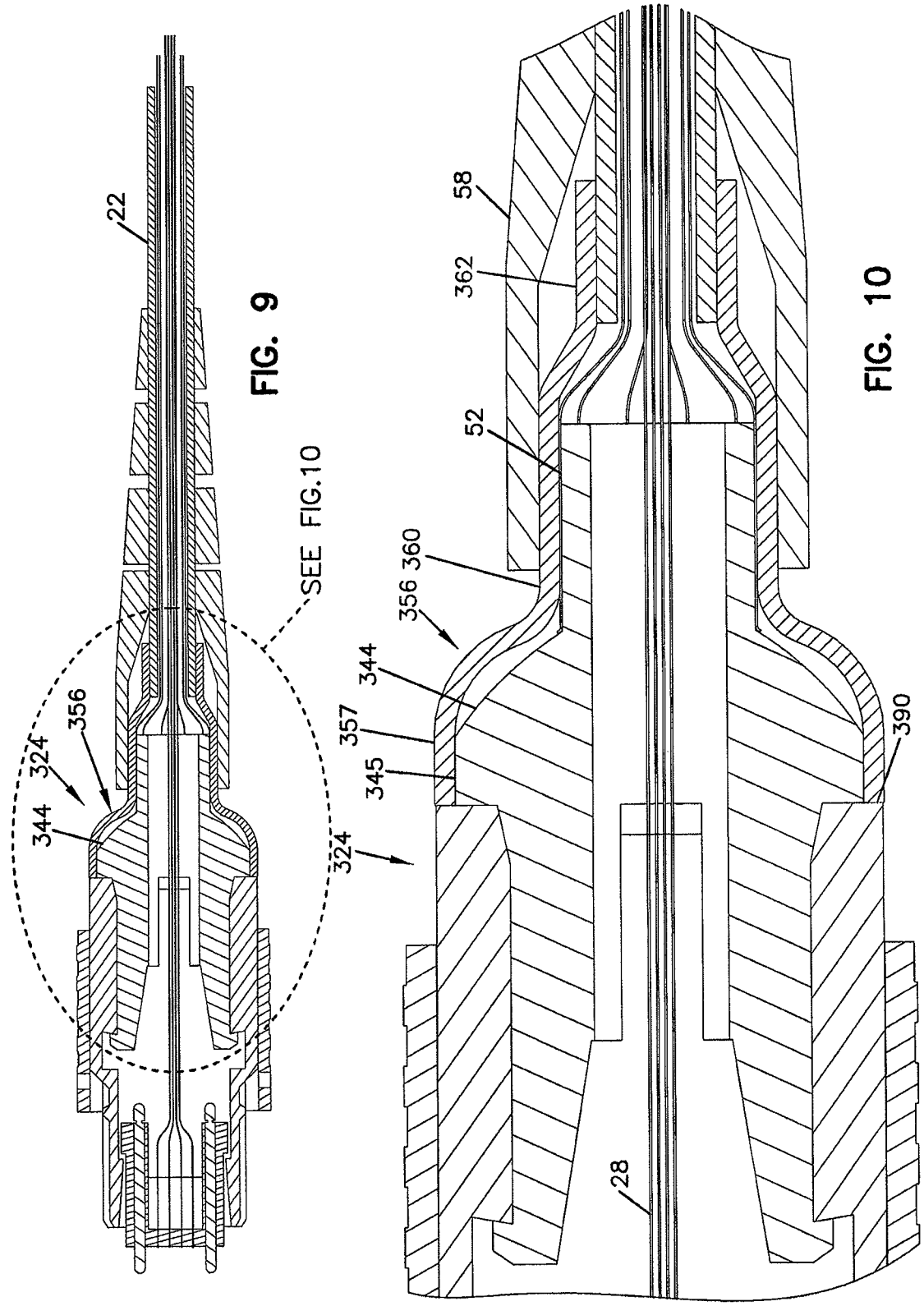

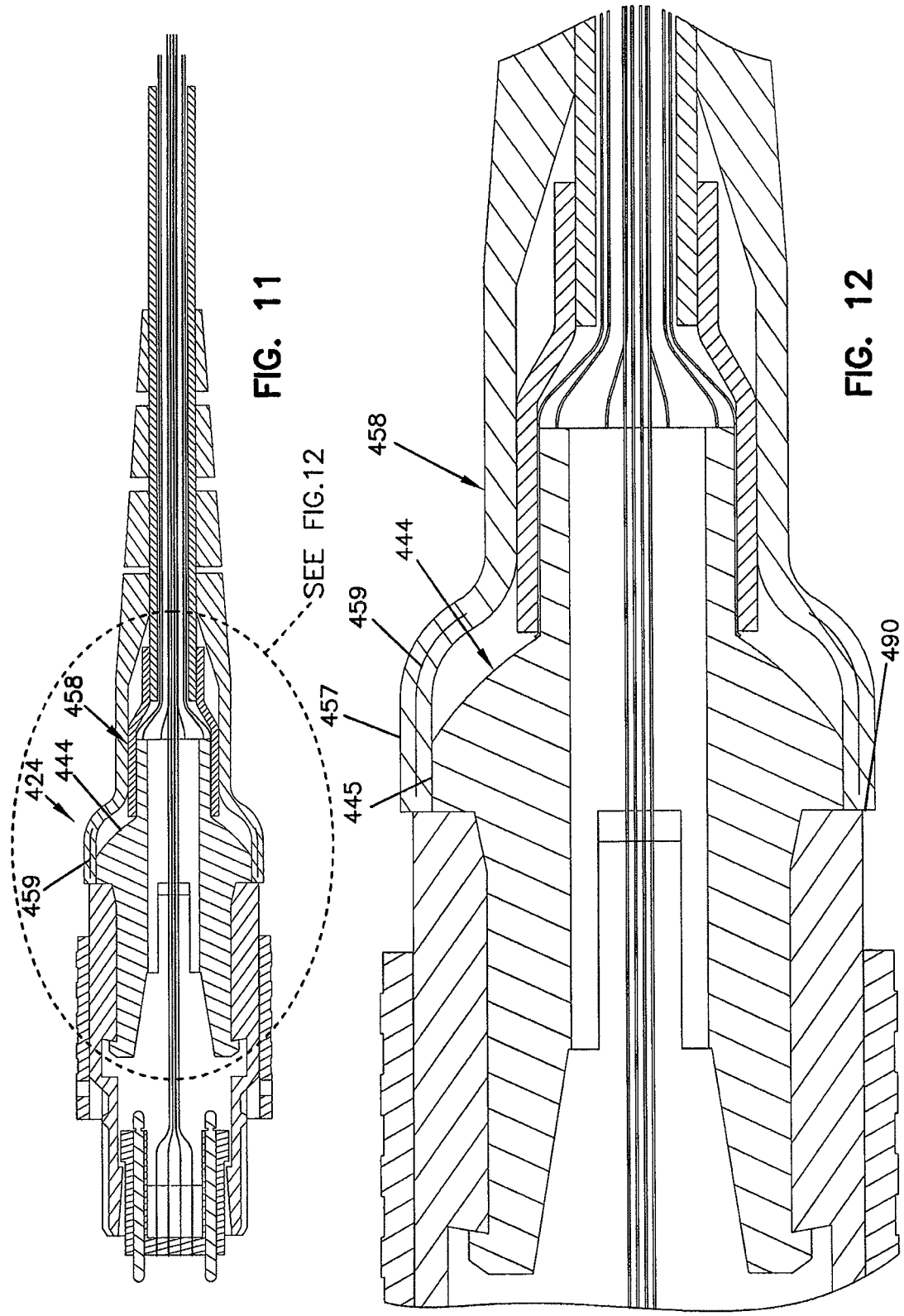

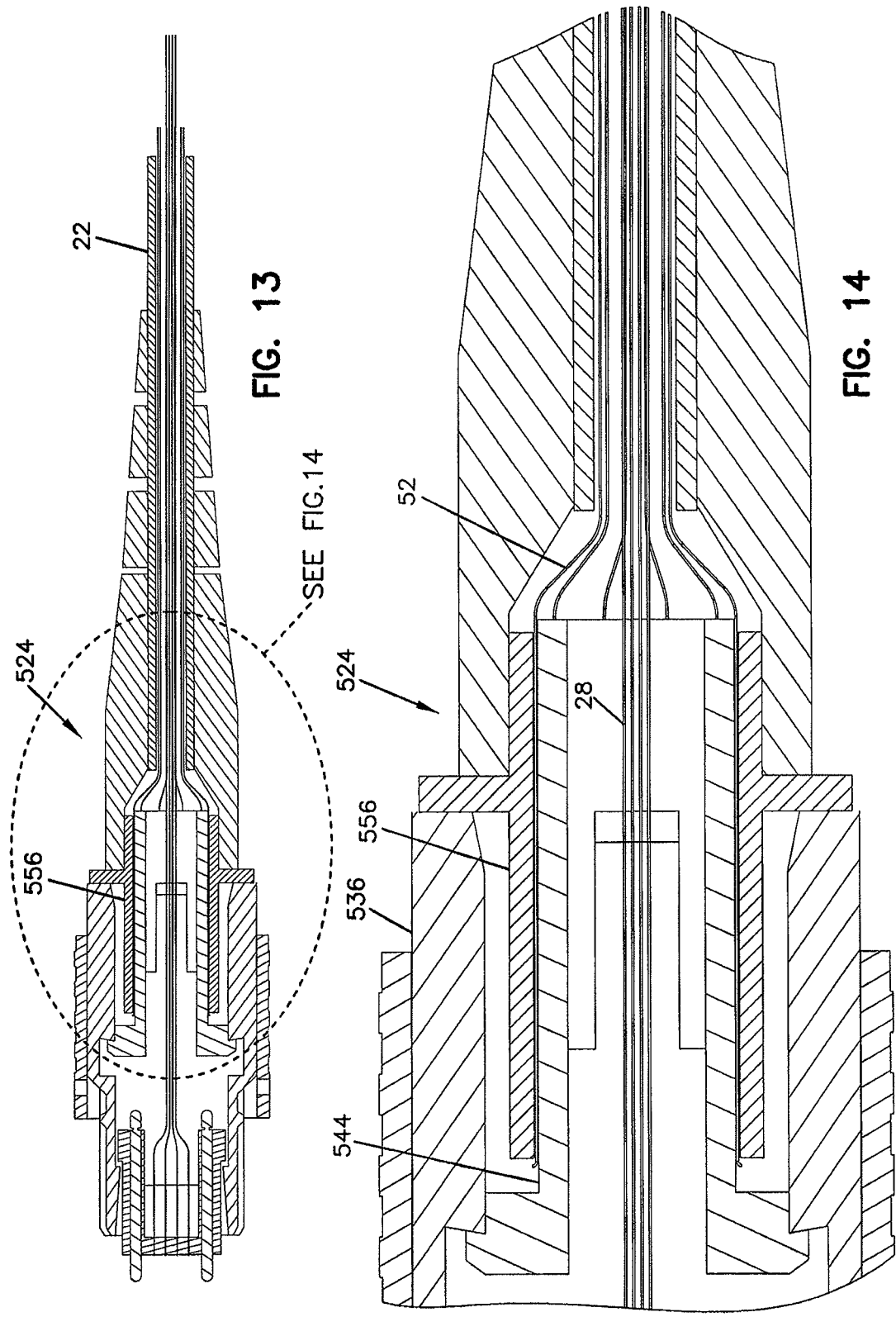

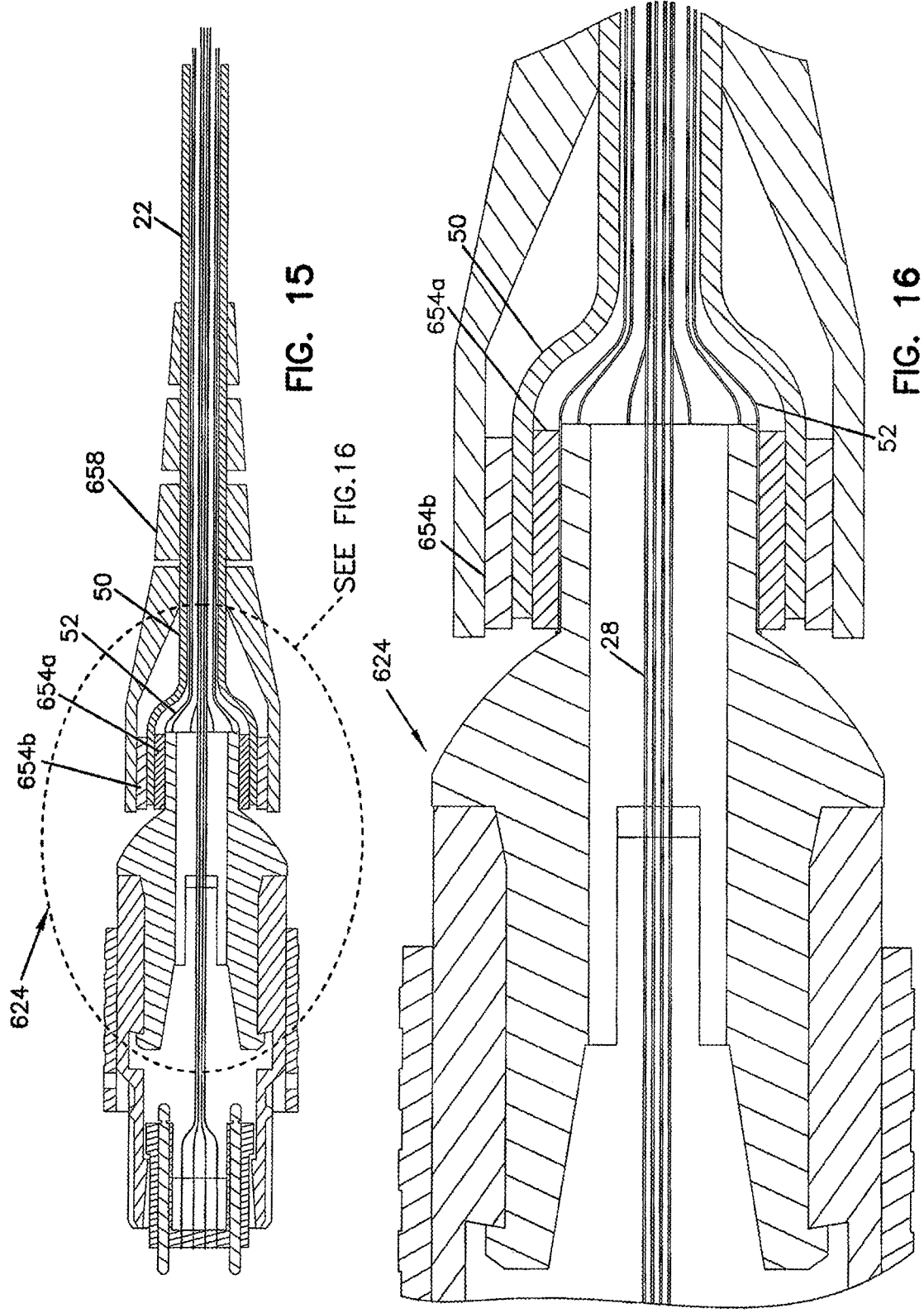

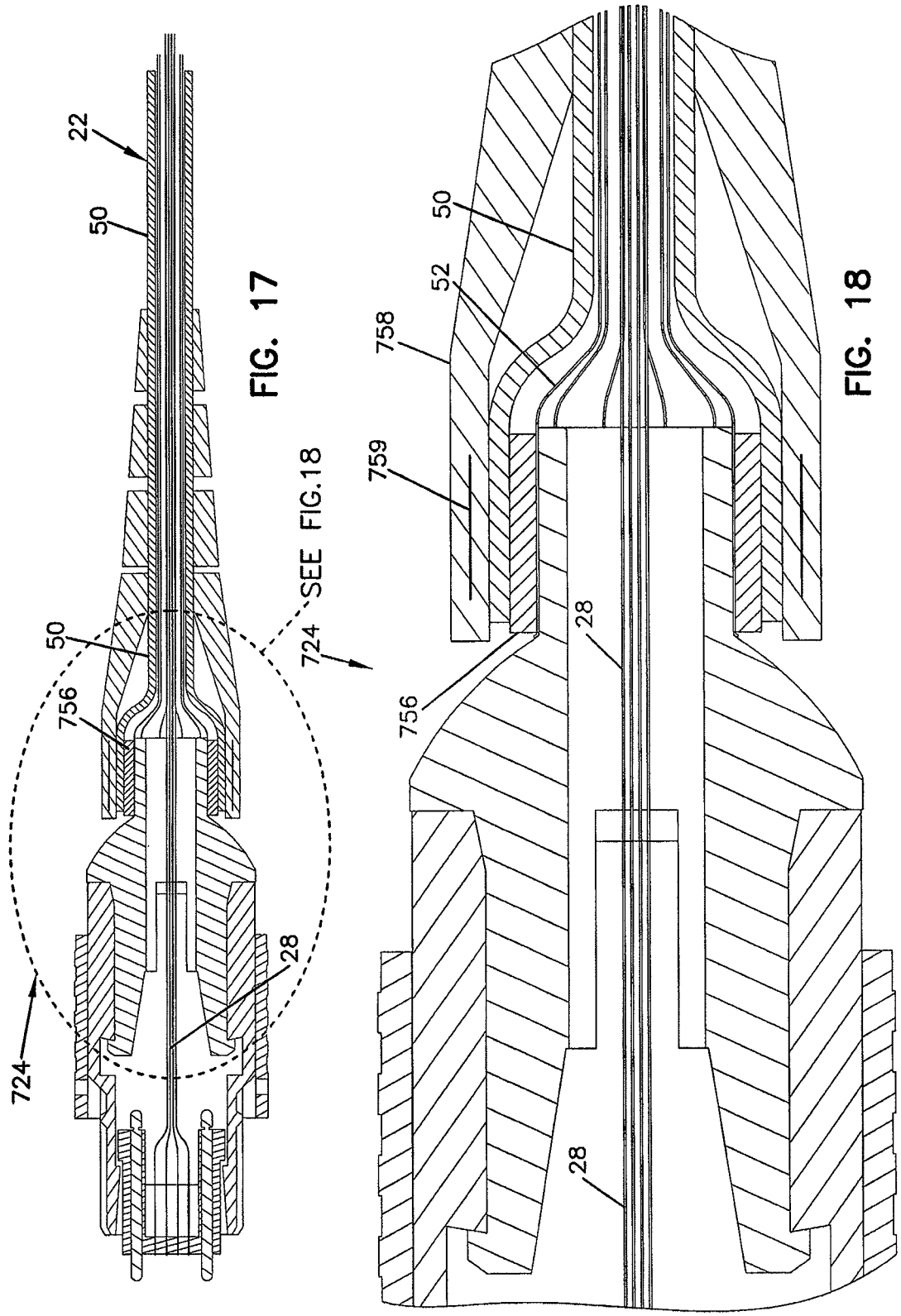

MECHANICAL INTERFACE BETWEEN A FIBER OPTIC CABLE AND A FIBER OPTIC CONNECTOR

CROSS-REFERENCE TO RELATED APPLICATIONS

This application is a continuation of application Ser. No. 15/707,252, filed Sep. 18, 2017 now U.S. Pat. No. 10,247,888, which is a continuation of application Ser. No. 14/176,940, filed Feb. 10, 2014, now U.S. Pat. No. 9,766,413, which application is a divisional of application Ser. No. 12/782,929, filed May 19, 2010, now U.S. Pat. No. 8,646,989, issued Feb. 11, 2014, which application claims the benefit of provisional application Ser. No. 61/179,673, filed May 19, 2009, which applications are incorporated herein by reference in their entirety.

TECHNICAL FIELD

The present disclosure relates to fiber optic data transmission, and more particularly to fiber optic cable connection systems.

BACKGROUND

Fiber optic cables are widely used to transmit light signals for high speed data transmission. The fiber optic cables include an optical fiber or optical fibers. The optical fibers function to carry the light signals (i.e., optical signals). A typical optical fiber includes an inner core surrounded by a cladding that is covered by a coating.

Fiber optic cable connection systems are used to facilitate connecting and disconnecting the fiber optic cables in the field without requiring a splice. A typical fiber optic cable connection system for interconnecting two fiber optic cables includes fiber optic connectors (i.e., optical fiber connectors) mounted at ends of the fiber optic cables, and an adapter for mechanically and optically coupling the fiber optic connectors together. The fiber optic connectors generally include ferrules that support ends of the optical fibers of the fiber optic cables. End faces of the ferrules are typically polished and are often angled. The adapter includes co-axially aligned ports (i.e., receptacles) for receiving the fiber optic connectors desired to be interconnected. The adapter generally includes an internal sleeve that receives and aligns the ferrules of the fiber optic connectors when the connectors are inserted within the ports of the adapter. With the ferrules and their associated fibers aligned and abutted within the sleeve of the adapter, a fiber optic signal can pass from one fiber to the next corresponding fiber via an optical interface created by this arrangement. The adapter also typically has a mechanical fastening arrangement (e.g., a snap-fit arrangement, a latch, etc.) for mechanically retaining the fiber optic connectors within the adapter.

Fiber optic cables are currently being routed to customer premises (e.g., fiber-to-the premises). During installation of fiber optic cable in buildings, pulling eyes attached to fiber optic connectors are used to pull fiber optic cables through conduits within the building. The use of pulling eyes attached to fiber optic connectors to pull fiber optic cables through conduits places tension on the mechanical interfaces between the fiber optic connectors and their corresponding fiber optic cables. This can cause the mechanical interfaces to fail under the tension loading. Additionally, during installation of connectorized fiber optic cables, side loads/bending moments can be applied to the fiber optic connectors thereby causing breakage.

SUMMARY

One aspect of the present disclosure relates to a mechanical interface between a fiber optic connector and a fiber optic cable that can withstand relatively high tension loading without failing. In one embodiment, the mechanical interface can withstand at least 75 pounds of tensile loading.

Another aspect of the present disclosure relates to a fiber optic connector having a front end with a ferrule and a rear end adapted to be mechanically coupled to a fiber optic cable. The rear end of the fiber optic connector is configured to resist breakage caused by side loadings/bending moments applied to the fiber optic connector.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 3 is a cross-sectional view of the fiber optic cable and connector assembly of FIG. 1, the cross-sectional view taken at a plane illustrated at FIG. 2;

FIG. 4 is an enlarged portion of FIG. 3;

FIG. 5 is a cross-sectional view of another fiber optic cable and connector assembly in accordance with the principles of the present disclosure, the cross-sectional view taken through a pair of pins of the fiber optic cable and connector assembly;

FIG. 6 is an enlarged portion of FIG. 5;

FIG. 7 is a cross-sectional view of another fiber optic cable and connector assembly in accordance with the principles of the present disclosure, the cross-sectional view taken through a pair of pins of the fiber optic cable and connector assembly;

FIG. 8 is an enlarged portion of FIG. 7;

FIG. 9 is a cross-sectional view of another fiber optic cable and connector assembly in accordance with the principles of the present disclosure, the cross-sectional view taken through a pair of pins of the fiber optic cable and connector assembly;

FIG. 10 is an enlarged portion of FIG. 9;

FIG. 11 is a cross-sectional view of another fiber optic cable and connector assembly in accordance with the principles of the present disclosure, the cross-sectional view taken through a pair of pins of the fiber optic cable and connector assembly;

FIG. 12 is an enlarged portion of FIG. 11;

FIG. 13 is a cross-sectional view of another fiber optic cable and connector assembly in accordance with the principles of the present disclosure, the cross-sectional view taken through a pair of pins of the fiber optic cable and connector assembly;

FIG. 14 is an enlarged portion of FIG. 13;

FIG. 15 is a cross-sectional view of another fiber optic cable and connector assembly in accordance with the principles of the present disclosure, the cross-sectional view taken through a pair of pins of the fiber optic cable and connector assembly;

FIG. 16 is an enlarged portion of FIG. 15;

FIG. 17 is a cross-sectional view of another fiber optic cable and connector assembly in accordance with the principles of the present disclosure, the cross-sectional view taken through a pair of pins of the fiber optic cable and connector assembly; and FIG. 18 is an enlarged portion of FIG. 17.

DETAILED DESCRIPTION

Figure 1:
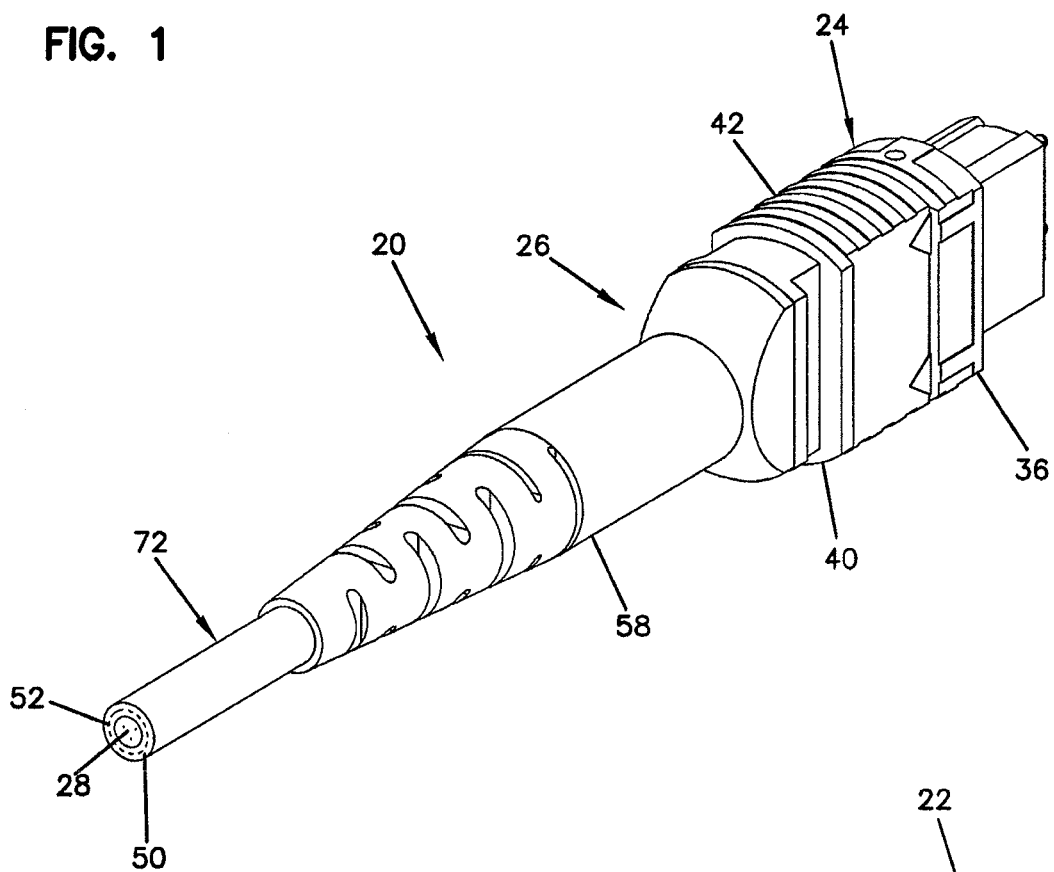
FIG. 1 is a perspective view of a fiber optic cable and connector assembly in accordance with the principles of the present disclosure, the perspective view showing a proximal end of the fiber optic cable and connector assembly.
Figure 2:
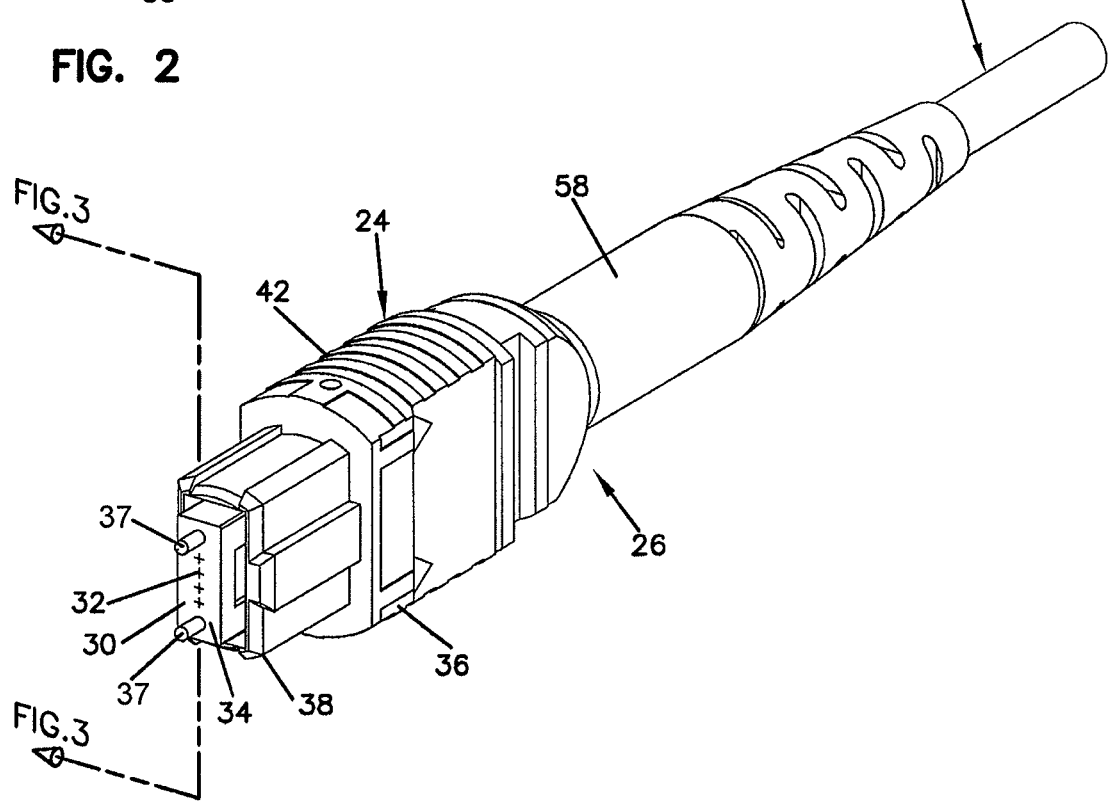
FIG. 2 is another perspective view of the fiber optic cable and connector assembly of FIG. 1, the perspective view showing a distal end of the fiber optic cable and connector assembly.

FIGS. 1 and 2 show a fiber optic cable and connector assembly 20 in accordance with the principles of the present disclosure. The fiber optic connector and cable assembly 20 includes fiber optic cable 22 mechanically connected to a fiber optic connector 24 at a mechanical interface 26. The fiber optic cable 22 includes a plurality of optical fibers 28 (e.g., 12 fibers, 24 fibers, or any other number of fibers) having end portions that terminate at a ferrule 30 of the fiber optic connector 24. The end portions of the optical fibers 28 are typically secured (e.g. with epoxy) within openings defined by the ferrule 30 and have polished ends 32 (shown schematically at FIG. 2) located at an end face 34 of the ferrule 30. The ferrule 30 can include alignment structures (e.g., pins 36, pin receivers, or other structures) for aligning the ferrules of two connectors desired to be connected together. When two fiber optic connectors are connected together, the polished ends 32 of their respective optical fibers 28 are preferably placed in co-axial alignment with one another such that optical transmissions can readily be transferred from fiber to fiber.

Referring to FIGS. 3 and 4, the fiber optic connector 24 includes a main connector body 36 having a distal end 38 positioned opposite from a proximal end 40. A release sleeve 42 is slidably mounted about the main connector body 36 at a location between the distal end 38 and the proximal end 40. The release sleeve 42 can be slidably retracted on the main connector body 36 to disengage the fiber optic connector 24 from a fiber optic adapter. The ferrule 30 mounts at the distal end 38 of the main connector body 36 and a spring push 44 mounts at the proximal end 40 of the main connector body 36. The spring push 44 engages a spring 46 (shown only at FIG. 3 for clarity) positioned within the main connector body 36 that biases the ferrule 30 in a distal direction. The spring push 44 is secured to the main connector body 36 by a mechanical connection such as a snap-fit connection.

Referring back to FIG. 1, the optical fibers 28 of the fiber optic cable 22 are contained within an outer jacket 50. The fiber optic cable 22 also includes strength members 52 positioned inside the outer jacket 50 and around the optical fibers 28. In one embodiment, the strength members 52 are configured to provide the fiber optic cable 22 with tensile strength without substantially decreasing the flexibility of the fiber optic cable 22. By way of example, the strength members 52 can include the plurality of flexible members such as aramid yarns (i.e., Kevlar).

The mechanical interface 26 includes a crimp supporting stub 54 (i.e., a barrel) that projects proximally outwardly from a main body of the spring push 44, a crimp band 56, and an outer boot 58. The crimp band 56 can be made of a deformable metal material. In one embodiment, the crimp band 56 includes a first portion 60 connected to a second portion 62 by a radial in-step 64. The first portion 60 is crimped over the crimp supporting stub 54 and has a larger transverse cross-dimension than the second portion 62. The first portion 60 of the crimp band 56 functions to secure the strength members 52 of the fiber optic cable 22 to the fiber optic connector 24. Specifically, the strength members 52 are mechanically crimped between the first portion 60 and the outer surface of the crimp supporting stub 54. The second portion 62 is crimped down on the outer jacket 50 of the fiber optic cable 22 to secure the outer jacket 50 to the fiber optic connector 24. The outer boot 58 includes a distal end 66 that mounts over the crimp band 56 and a proximal end that mounts over the fiber optic cable 22. The boot 58 can have a tapered configuration that transitions from a larger cross-dimension adjacent the distal end 66 to a smaller cross-dimension adjacent the proximal end 68.

After crimping, the crimp band 56 can have a number of different transverse cross-sectional shapes. In one embodiment, the crimp band 56 can have a polygonal shape (e.g., a hexagonal shape) after crimping. When the crimp band 56 is crimped over the crimp supporting stub 54, the crimp supporting stub 54 can deform to conform to/match the final shape of the crimp band 56. For example, the crimp supporting stub 54 can have a polygonal shape after crimping. In other embodiments, the crimp band 56 can include at least portions that are generally cylindrical after crimping.

It is desirable for the mechanical interface 26 to be able to withstand an axial tension load of at least 75 pound without failure (i.e., without the fiber optic connector 24 pulling away from the fiber optic cable 22). To improve the ability of the mechanical interface 26 to withstand high tensile loads, the first portion 60 of the crimp band 56 includes an inner surface 80 including strength member biting or gripping features 82 adapted for securely engaging the strength members 52 when the strength members 52 are crimped between the first portion 60 of the crimp band 56 and the crimp supporting stub 54. In certain embodiments, the gripping features 82 can include helical threads, teeth, knurling, projections, bumps or other structures. In certain embodiments, the gripping features 82 have an undulating configuration with relatively sharp peaks and valleys such as those formed by a thread pattern tapped or otherwise formed within the interior of the crimp band 56. In further embodiments, gripping features as described above can also be provided on the exterior surface of the crimp supporting stub 54. In such embodiments, the gripping features of the crimp band and the gripping features of the crimp supporting stub cooperate to secure the strength members between the crimp band and the crimp supporting stub.

To further enhance the ability of the mechanical interface 26 to withstand relatively large tensile loads, the second portion 62 of the crimp band 56 can be provided with gripping features 84 for gripping the outer jacket 50 of a fiber optic cable 22. As shown at FIG. 3, the gripping features 84 include through-holes defined radially through the second portion 62 of the crimp band 56. When the second portion 62 of the crimp band 56 is crimped down on the outer jacket 50, portions of the outer jacket 50 flow or otherwise deform into the through-holes 84 thereby providing a mechanical interlock that assists in maintaining engagement between the outer jacket 50 and the second portion 62 of the crimp band 56. In other embodiments, the gripping features on the second portion 62 may include ridges, bumps, dimples, depressions, teeth, or other structures.

FIGS. 5 and 6 show an alternative fiber optic connector 124. The fiber optic connector 124 has the same components as the fiber optic connector 24 except for the configuration of the spring push. Specifically, the spring push 44 of the fiber optic connector 24 has a solid, homogeneous molded plastic construction. In contrast, the spring push 144 has a composite structure including a metal insert piece 150 embedded within an over-molded plastic piece 152. The metal insert piece 150 forms the crimp supporting stub of the spring push 144. Additionally, the insert piece 150 extends across a region 156 of the spring push 144 thereby providing the region 156 with structural reinforcement. In this way, region 156 is better able to withstand bending loads without breaking.

FIGS. 7 and 8 show another fiber optic connector 224 in accordance with the principles of the present disclosure. The fiber optic connector 224 has the same components as the fiber optic connector 24 except the spring push and the crimp band have been modified. Specifically, the fiber optic connector 224 includes a spring push 244 defining an internal annular recess 245 that surrounds a central axis of the fiber optic connector 224. The recess has an open end 247 that faces proximally outwardly from the spring push 244. The recess 245 is configured to receive an extended portion 255 of a crimp band 256 such that the crimp band 256 extends into and reinforces the spring push 244 and the connector body against bending forces applied to the crimp supporting stub. The crimp band 256 also includes a first portion 260 crimped about the crimp supporting stub and a second portion 262 crimped on the outer jacket 50 of the fiber optic cable 22.

FIGS. 9 and 10 show another fiber optic connector 324 in accordance with the principles of the present disclosure. The fiber optic connector 324 has the same components as the fiber optic connector 24 except the spring push and the crimp band have been modified. Specifically, the fiber optic connector 324 includes a crimp band 356 and a spring push 344. The crimp band 356 includes an enlarged portion 357 that extends distally past the crimp supporting stub and fits over an enlarged region 345 of the spring push 344. The crimp band 356 also includes a first portion 360 crimped about the crimp supporting stub and a second portion 362 crimped on the outer jacket 50 of the fiber optic cable 22. Enlarged portion 357 of the crimp band 356 fits snugly over an enlarged portion 345 of the spring push 344 and reinforces the spring push against bending loads applied to the crimp supporting stub. The enlarged portion 345 of the spring push 344 has a smaller cross-dimension than the cross-dimension of the main body of the connector 324 such that a shoulder 390 is defined at the distal end of the spring push and the proximal end of the main body. The shoulder 390 allows the enlarged portion 357 of the crimp band 356 to be flush or almost flush with the outer surface of the main body of the fiber optic connector 324.

FIGS. 11 and 12 show another fiber optic connector 424 in accordance with the principles of the present disclosure. The fiber optic connector 424 has the same components as the fiber optic connector 24 except the spring push and the boot have been modified. Specifically, the fiber optic connector 424 includes a boot 458 and a spring push 444. The boot 458 includes an enlarged portion 457 that extends distally past the crimp supporting stub and fits over an enlarged region 445 of the spring push 444. The boot 458 can include an internal reinforcing member 459 (e.g., a sleeve such as a metal sleeve). The enlarged portion 457 of the boot 458 fits snugly over an enlarged portion 445 of the spring push 444 and reinforces the spring push against bending loads applied to the crimp supporting stub. The enlarged portion 445 of the spring push 444 has a smaller cross-dimension than the cross-dimension of the main body of the connector 424 such that a shoulder 490 is defined at the distal end of the spring push and the proximal end of the main body. The shoulder 490 allows the enlarged portion 457 of the boot 458 to be flush or almost flush with the outer surface of the main body of the fiber optic connector 424.

FIGS. 13 and 14 show another fiber optic connector 524 in accordance with the principles of the present disclosure. The fiber optic connector 524 has the same components as the fiber optic connector 24 except the spring push, the crimp band and the connector main body have been modified. The fiber optic connector 524 has a configuration in which a crimp band 556 is crimped over a spring push 544 and includes a crimped portion that extends inside a main connector body 536 of the fiber optic connector 524. During assembly, the strength members 52 of the fiber optic cable are initially crimped onto the spring push 544, and the spring push 544 is then snapped into the back end of the main connector body 536. In this way, the crimp band 556 can be positioned to reinforce the spring push 544 with respect to bending, and in certain embodiments the distance that the crimp supporting stub projects outwardly from the main connector body 536 can be shortened.

FIGS. 15 and 16 show another fiber optic connector 624 in accordance with the principles of the present disclosure. The fiber optic connector 624 has the same components as the fiber optic connector 24 except a different crimping arrangement is being used. The crimping arrangement is adapted to be shorter in a direction along the longitudinal axis of the connector 624 thereby possibly reducing a bending moment applied to the crimp supporting stub when side loading is applied to the crimp supporting stub through the fiber optic cable and the boot. The crimping arrangement includes a first crimp band 656a for crimping the strength members 52 of the fiber optic cable 22 to the crimp supporting stub to secure the strength members 52 to the connector 624. The crimping arrangement also includes a second crimp band 656b for crimping the cable jacket 50 over the first crimp band 656b to secure the outer jacket 50 to the connector 624. The connector 624 also has a shortened boot 658.

FIGS. 17 and 18 show another fiber optic connector 724 in accordance with the principles of the present disclosure. The fiber optic connector 724 has the same components as the fiber optic connector 24 except a different crimping arrangement is being used. The crimping arrangement is adapted to be shorter in a direction along the longitudinal axis of the connector 724 thereby possibly reducing a bending moment applied to the crimp supporting stub when side loading is applied to the crimp supporting stub through the fiber optic cable and the boot. The crimping arrangement includes a crimp band 756 for crimping the strength members 52 of the fiber optic cable 22 to the crimp supporting stub to secure the strength members 52 to the connector 724. The fiber optic connector 724 also includes a shortened boot 758 having an internal reinforcing member 759 such as a metal reinforcing sleeve. The boot 758 compresses the outer jacket 50 of the fiber optic cable 22 against the outer surface of the crimp band 756 to secure the outer jacket 50 to the fiber optic connector 724.

What is claimed is:

1. A fiber optic connector comprising:
    a main connector body extending between a proximal end and a distal end;
    a release sleeve slidably mounted about the main connector body at a location between the proximal and distal ends;
    a ferrule mounted at the distal end of the main connector body, the ferrule including alignment structures configured to align the ferrule with a ferrule of a mating connector;
    a spring disposed within the main connector body, the spring biasing the ferrule distally relative to the main connector body; and
    a spring push mounted at the proximal end of the main connector body, the spring push extending along a longitudinal axis from a proximal end to a distal end, the spring push including a spring seat to retain the spring within the main connector body, the spring seat being disposed between the proximal and distal ends of the spring push, the spring push including a metal insert piece embedded within an overmolded plastic piece, the metal insert piece forming a crimp supporting stub at the proximal end of the spring push, the plastic piece defining the distal end of the spring push.

2. The fiber optic connector of claim 1, wherein the spring push defines a passage extending along the longitudinal axis of the spring push, the passage being defined by both the metal insert and the plastic piece.

3. The fiber optic connector of claim 1, wherein the plastic piece includes two arms extending distally from a base section, the base section being overmolded about the metal insert, the arms extending distally away from the metal insert.

4. The fiber optic connector of claim 3, wherein the spring push defines a passage extending along the longitudinal axis of the spring push through the base section and between the two arms.

5. The fiber optic connector of claim 3, wherein a latch member is disposed at distal ends of the two arms.

6. The fiber optic connector of claim 3, wherein the base section has an outer cross-sectional dimension that generally matches an outer cross-sectional dimension of the main connector body.

7. The fiber optic connector of claim 3, wherein an outer surface of the base section of the plastic piece contours towards the metal insert.

8. The fiber optic connector of claim 1, wherein at least half of the metal insert is embedded within the plastic piece.

9. The fiber optic connector of claim 1, wherein the fiber optic connector is an MPO connector.

10. The fiber optic connector of claim 1, further comprising a fiber optic cable including at least one optical fiber and a jacket surrounding the optical fiber, the optical fiber being held at the ferrule so that the fiber optic cable is terminated by the fiber optic connector.

11. The fiber optic connector of claim 10, further comprising a crimp band sized to fit about the crimp supporting stub of the spring push to secure the fiber optic cable to the fiber optic connector.

12. The fiber optic connector of claim 11, wherein the fiber optic cable includes at least one strength member disposed within the jacket, the at least one strength member being secured between the crimp band and the crimp supporting stub.

13. The fiber optic connector of claim 10, further comprising a boot covering a portion of the spring push and a portion of the fiber optic cable.

14. The fiber optic connector of claim 12, further comprising a boot covering at least a portion of the crimp band and a portion of the fiber optic cable.

15. The fiber optic connector of claim 1, wherein the spring push is secured to the main connector body by a snap-fit connection.

16. The fiber optic connector of claim 1, wherein the fiber optic connector does not provide an electrical connection.

17. A fiber optic cable and connector assembly comprising:
    a plug connector terminating the optical fiber cable, the plug connector including:
        a main connector body extending between a proximal end and a distal end;
        a release sleeve slidably mounted about the main connector body at a location between the proximal and distal ends;
        a ferrule mounted at the distal end of the main connector body, the ferrule including alignment structures configured to align the ferrule with a ferrule of a mating connector;
        a spring disposed within the main connector body, the spring biasing the ferrule distally relative to the main connector body; and
        a spring push mounted at the proximal end of the main connector body, the spring push extending along a longitudinal axis from a proximal end to a distal end, the spring push including a spring engagement seat to retain the spring within the main connector body, the spring push including a metal insert piece embedded within an overmolded plastic piece, the metal insert piece forming a crimp supporting stub at the proximal end of the spring push, the plastic piece defining the distal end of the spring push,
    an optical fiber cable including a plurality of optical fibers, the optical fiber cable not including an electrical conductor, the optical fiber cable being crimped onto the crimp supporting stub.

18. The fiber optic cable and connector assembly of claim 17, wherein the metal insert piece extends at least partially into the main connector body.

19. The fiber optic cable and connector assembly of claim 17, wherein the metal insert piece includes a distal flange positioned at the proximal end of the main connector body.

20. The fiber optic cable and connector assembly of claim 17, wherein the metal insert piece is shorter than the overmolded plastic piece of the spring push.

21. The fiber optic cable and connector assembly of claim 17, wherein the spring engagement seat is disposed between the proximal and distal ends of the spring push.

22. A fiber optic connector having a longitudinal axis, the fiber optic connector comprising:
    a main connector body extending between a proximal end and a distal end;
    a ferrule carried by the main connector body, the ferrule having a length that extends along the longitudinal axis of the fiber optic connector, the ferrule also having major and minor cross-dimensions that are perpendicular relative to one another and to the longitudinal axis, the ferrule defining alignment pin openings;
    a plurality of optical fibers supported in the ferrule in a row extending along the major cross-dimension of the ferrule, the row being positioned between the alignment pin openings defined by the ferrule;

a spring push mounted at the proximal end of the main connector body, the spring push extending along the longitudinal axis of the fiber optic connector from a proximal end to a distal end, the spring push including a plastic spring push body having a length that extends along the longitudinal axis, the plastic spring push body defining proximal head portion and latching legs that project distally from the proximal head portion along the length of the plastic spring push body, the proximal head portion having a major cross-dimension and a minor cross-dimension that respectively align with the major and minor cross-dimensions of the ferrule, the proximal head portion including shoulders separated by the major cross-dimension that engage the proximal end of the main connector body, the latching legs including latch surfaces adjacent distal ends of the latching legs that engage internal catches defined within the main connector body, the distal ends of the latching legs defining the distal end of the spring push, the plastic spring push body including a spring seat positioned at an intermediate location along the length of the plastic spring push body, the spring seat supporting a proximal end of a spring to retain the spring within the main connector body, the spring push also including a metal insert piece embedded within the proximal head portion of the plastic spring push body, the metal insert piece forming a crimp supporting stub at the proximal end of the spring push that projects proximally from the proximal head portion.

23. The fiber optic connector of claim 22, wherein the metal insert piece includes a flange embedded in the proximal head portion of the plastic spring push body.

24. The fiber optic connector of claim 22, wherein the metal insert piece is shorter than the plastic spring push body.

25. The fiber optic connector of claim 22, wherein the metal insert piece extends at least partially into the main connector body.

* * * * *